United States Patent [19]

Horn et al.

[11] Patent Number: 4,886,133

[45] Date of Patent: Dec. 12, 1989

[54] ELECTROMECHANICAL SCALE

[75] Inventors: Jürgen Horn, Schwülper-Lagesbüttel; Walter Kitzing, Solingen, both of Fed. Rep. of Germany

[73] Assignee: Robert Krups Stiftung & Co. KG, Solingen, Fed. Rep. of Germany

[21] Appl. No.: 254,265

[22] Filed: Oct. 5, 1988

[30] Foreign Application Priority Data

Oct. 8, 1987 [DE] Fed. Rep. of Germany ....... 3733961

[51] Int. Cl.⁴ ........................... G01G 3/14; G01G 3/08
[52] U.S. Cl. ..................................... 177/211; 177/229
[58] Field of Search ................................ 177/211, 229; 73/862.65

[56] References Cited

U.S. PATENT DOCUMENTS

| | | | |
|---|---|---|---|
| 4,546,838 | 10/1985 | Ormond | 177/211 |
| 4,565,255 | 1/1986 | Sarrazin | 177/211 |
| 4,577,709 | 3/1986 | Shibahara et al. | 177/211 |
| 4,600,067 | 7/1986 | Artigue et al. | 177/229 X |
| 4,653,599 | 3/1987 | Johnson | 73/862.65 X |
| 4,655,305 | 4/1987 | Jacobson | 73/862.65 X |
| 4,775,018 | 10/1988 | Kroll et al. | 177/211 X |

Primary Examiner—George H. Miller, Jr.
Attorney, Agent, or Firm—Peter K. Kontler

[57] ABSTRACT

An electromechanical scale wherein the platform transmits a load to lateral surfaces at one end of the carrier of a strain gauge and the other end of the carrier is affixed to the base of the scale. This contributes to a reduction of overall height of the scale. The carrier has a median portion with a web in the central symmetry plane of the carrier, and such web supports one or more strip-shaped resistors or semiconductors of the strain gauge. The ends of the carrier can be permanently or separably connected to the platform and/or to the base.

37 Claims, 5 Drawing Sheets

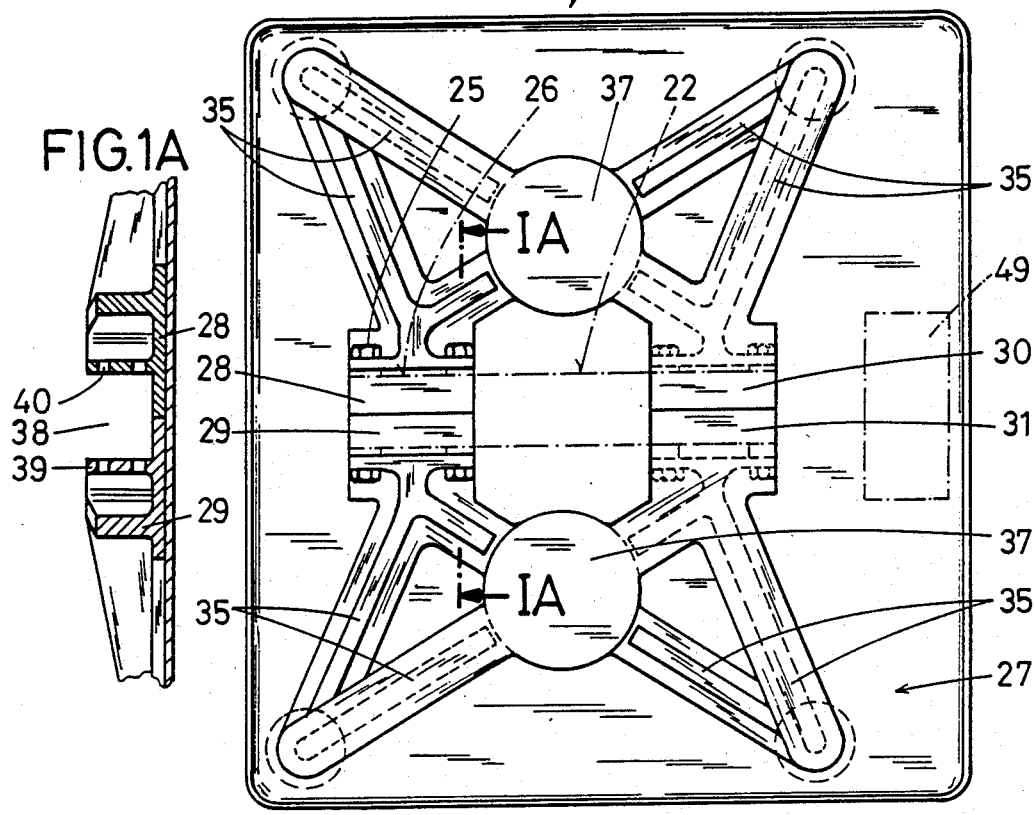
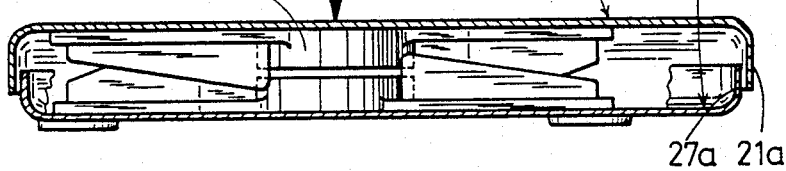
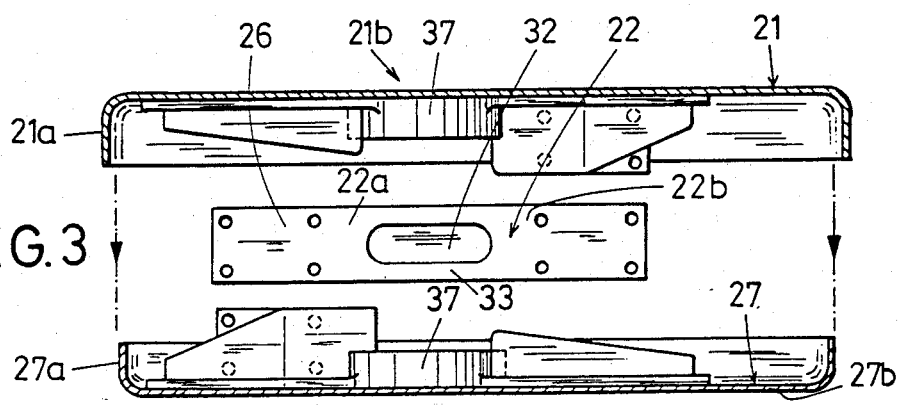

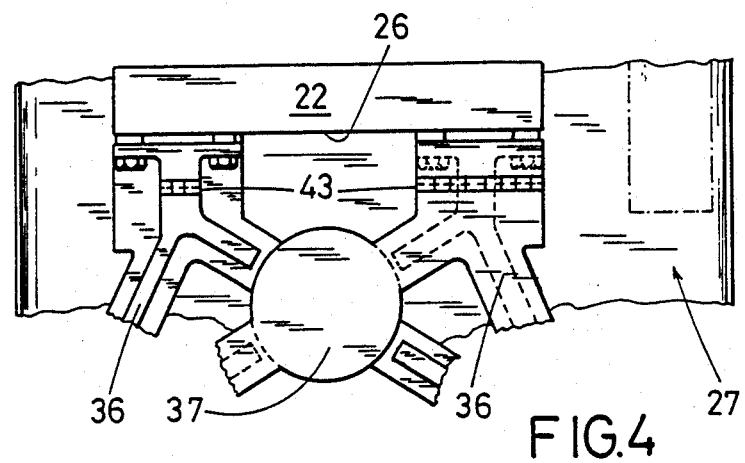
FIG. 4
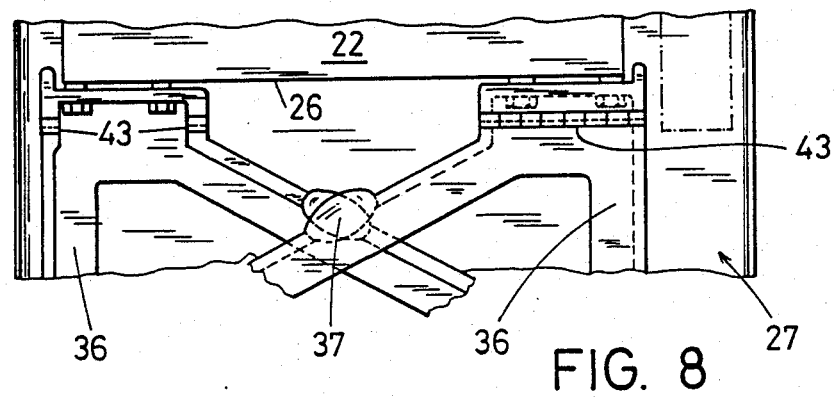
FIG. 8
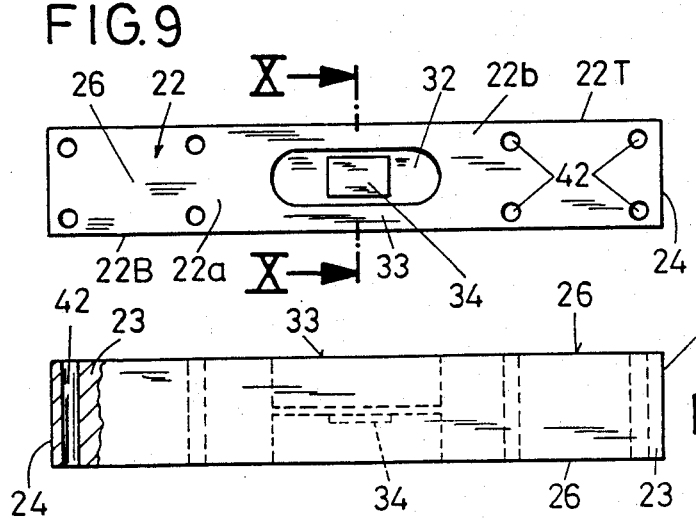 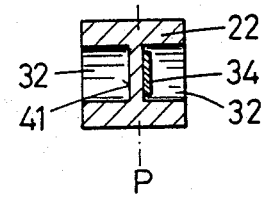
FIG. 9  FIG. 10
FIG. 11

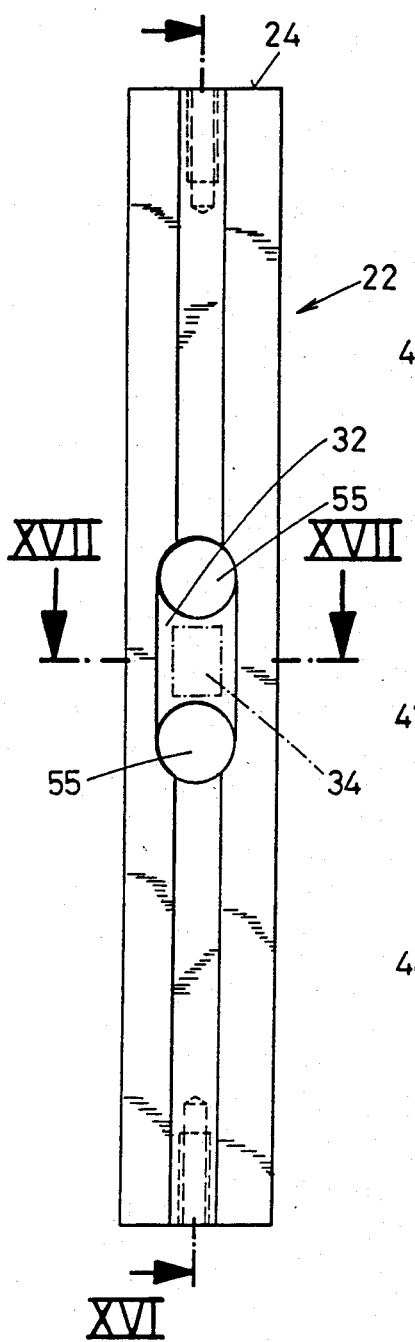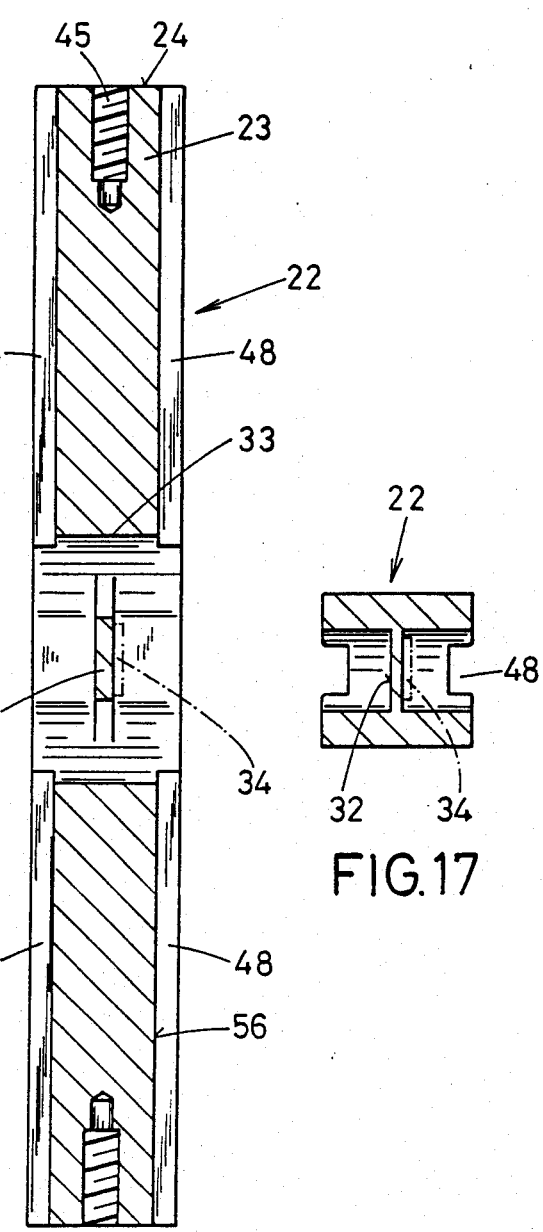
FIG. 15   FIG. 16   FIG. 17

ELECTROMECHANICAL SCALE

CROSS-REFERENCE TO RELATED CASES

The scale of the present invention constitutes an improvement over and a further development of the scale which is disclosed in the commonly owned copending patent application Ser. No. 056,852 filed June 1, 1987 by Erich Hoffmann for "Bathroom Scale", now U.S. Pat. No. 4,765,422 granted Aug. 23, 1988.

The configuration of the scale of the present invention can be similar to or identical with that of the scale which is disclosed in the commonly owned copending design patent application Ser. No. 040,327 filed Apr. 20, 1987 by Gunter Storsberg for "Bathroom Scale".

BACKGROUND OF THE INVENTION

The invention relates to weighing scales in general, and more particularly to improvements in electromechanical weighing scales of the type wherein a deformable carrier supports one or more resistors or semiconductors serving to generate signals which are indicative of the load that is applied to the load receiving and transmitting member of the scale, e.g., to a platform forming part of a bathroom scale.

In accordance with a presently known proposal, the entire platform of a bathroom scale is made of a relatively stiff metallic sheet material and each corner of the platform is disposed above a strain gauge whose resistor changes its resistance in response to the application of a load to the upper side of the platform. The carriers of resistors in the strain gauges transmit forces to the base of the scale. The strain gauges operate independently of each other, and the circuit of the scale comprises means for totalizing the signals which are transmitted by the resistors of discrete strain gauges to thus ascertain the overall load, e.g., the weight of a person standing on the platform. Reference may be had, for example, to published European patent application No. 0 034 656 of Lockery.

Such scale is expensive because it must employ a substantial number (normally four) of strain gauges.

In accordance with another known proposal, the scale comprises a relatively stiff platform which is designed to transmit the load to a rigid base. The latter has four legs which transmit the load to the ground, e.g., to the floor of a bathroom. One end portion of a single strain gauge is secured to the underside of the platform by a first set of screws, and the other end portion of such single strain gauge is affixed to the base by a second set of screws. The base is located at a first level, the platform is located at a second level above the first level, and the strain gauge is disposed at a third level between the first and second levels. A drawback of this scale is that the combined height of the base, strain gauge and platform is excessive.

It was further proposed to employ in a weighing scale strain gauges wherein the carriers of resistors have a substantially I-shaped cross-sectional outline and are mounted in such a way that they are subjected to shearing stresses in response to the application of a load to the platform. One end of each carrier is anchored in a support, and the other end of each carrier receives a load which is transmitted to the median portion of the carrier and to the resistor which is associated therewith. The load which is applied to the other end of the carrier can be transmitted by way of and in the longitudinal direction of the carrier without adversely influencing the characteristics of the signal from the resistor, even if the distance from the other end portion of the carrier to the resistor varies within a rather wide range. In the first approximation, a load which is applied eccentrically of the longitudinal axis of the carrier does not affect the accuracy of the signal from the corresponding resistor. However, the eccentricity cannot exceed a relatively small fraction of one centimeter which does not suffice in actual practice.

Another drawback of many presently known weighing scales, especially bathroom scales, is that their space requirements are excessive, especially if such scales are to be carried along on trips or are to be put in storage when not in actual use. This has led to attempts to provide collapsible weighing scales, for example, of the type disclosed in German Offenlegungsschrift No. 31 40 483 of Wirtz who discloses a scale wherein the base and the platform are articulately connected to each other by hinges so that the scale can be converted into a flat panel-like body by pivoting the platform into the plane of the base. When the scale is to be put to use, the platform is pivoted to a position of overlap with the base. A drawback of this scale is that each of its two parts must be individually calibrated to ensure proper suppression of so-called corner load errors. In fact, each such part constitutes a discrete scale and the apparatus must employ not less than four discrete strain gauges. This contributes significantly to the cost of the apparatus, especially since each of the two individual scales necessitates accurate calibration in order to ensure that the sensitivity of the scale including the platform will match the sensitivity of the scale which includes the base. As a rule, the strain gauges employ expensive piezoelectric elements. If such expensive elements are replaced with primitive piezoelectric foils or with polycrystalline dieformed or pressed parts, the strain gauges exhibit a highly unsatisfactory linearity, reproducibility and accuracy, especially over longer periods of time. All in all, such scales failed to gain acceptance because they lack the accuracy which is expected from a bathroom scale or from a like weighing apparatus.

German Offenlegungsschrift No. 36 42 970 of Iida et al. discloses a further collapsible scale wherein two platforms (one for each foot of a person standing on the scale) are coupled to each other by a hinge and each platform forms part of a discrete scale. Each discrete scale must be individually calibrated to ensure that the scales will exhibit identical sensitivities and that the compensation for corner loads in one of the scales will match that for corner loads of the other scale. Each of the two scales has a discrete carrier for a resistor, and each carrier is an elongated elastic strip of metallic sheet material. The end portions of the strip are disposed between pairs of rod-shaped deformation applying members which transmit torque in response to the application of a load to the respective platform. The inventors named in this published German patent application presume that the relatively wide strip-shaped carriers will be in a position to integrate eccentrically applied loads. A drawback of the proposal of Iida et al. is that the collapsible scale is expensive and that its accuracy is far from satisfactory. One of the reasons for lack of accuracy is that the aforementioned rod-shaped members act not unlike knife edge bearings and their mounting is not sufficiently accurate to ensure that they will remain in predetermined positions relative to each other.

OBJECTS OF THE INVENTION

An object of the invention is to provide an electromechanical weighing scale, particularly a bathroom scale, which is or which can be made thinner or more flat than heretofore known scales and whose accuracy is not affected by such desirable reduction of its overall height.

Another object of the invention is to provide a novel and improved method of assembling the constituents of the scale.

A further object of the invention is to provide the scale with a novel and improved base, with a novel and improved load receiving and transmitting platform, and with a novel and improved strain gauge.

An additional object of the invention is to provide a weighing scale wherein the number of discrete parts can be a minute fraction of the number of parts in a conventional scale.

Still another object of the invention is to provide a novel and improved collapsible scale.

A further object of the invention is to provide the strain gauge of the above outlined scale with a novel and improved carrier for one or more resistors, semiconductors or other suitable signal generators.

Another object of the invention is to provide a collapsible weighing apparatus which constitutes a single weighing scale.

An additional object of the invention is to provide novel and improved means for connecting the strain gauge to other parts of the weighing scale.

Another object of the invention is to provide the weighing scale with novel and improved means for affording access to the signal generator or generators of the strain gauge.

A further object of the invention is to provide an eye-pleasing weighing scale whose space requirements in storage, during transport and/or at the locus of use are surprisingly small, even if the scale is not collapsible, and whose accuracy at least matches that of more expensive conventional weighing scales.

Another object of the invention is to provide an electromechanical weighing scale which can be readily assembled or taken apart in a simple and time-saving manner.

An additional object of the invention is to provide a novel and improved method of making the carrier for the signal generator or generators of the strain gauge which can be put to use in the above outlined scale.

SUMMARY OF THE INVENTION

The invention is embodied in an electromechanical weighing scale which comprises a base, a load receiving and transmitting member which can constitute a platform and is disposed above the base, a deformable carrier which is disposed between the base and the load receiving and transmitting member (hereinafter called member for short) and has at least one lateral surface, at least one deformation-responsive signal generator (such as a resistor or a semiconductor) which is operatively connected with the carrier, and means for deforming the carrier including means for connecting the lateral surface of the carrier to the member. This renders it possible to significantly reduce the overall height of the scale.

The carrier can constitute an elongated beam with two end portions each of which has an end face. One of these end faces can constitute or include the lateral surface of the carrier.

The connecting means can include means (e.g., one or more threaded fasteners) for separably securing the carrier to the member or means (e.g., an adhesive) for permanently securing the carrier to the member.

The arrangement may be such that one end portion of the elongated beam-shaped carrier is secured to the member and the other end portion of such carrier is affixed to the base. The affixing means can include one or more threaded fasteners or an adhesive for separably or permanently attaching the respective end portion of the carrier to the base.

The member and/or the base can include two sections which flank the respective end portion of the carrier. Connector means can be provided to secure the sections of the member and/or the sections of the base to each other. Alternatively or in addition to such connector means, the base and/or the member can be integral with each other.

The carrier can be made of drawn metallic material. The median portion of the carrier can have a substantially I-shaped cross-sectional outline and such median portion can be flanked by two additional portions having polygonal (preferably square or rectangular) cross-sectional outlines. The median portion can include two halves which are mirror symmetrical to each other with reference to a plane which extends longitudinally of and halves the carrier. The signal generator or generators are connected with the median portion of such carrier. In accordance with a presently preferred embodiment of the carrier, its median portion includes a centrally located web and has recesses at opposite sides of the web. Such recesses can constitute cutouts, i.e., they can be formed in a material removing machine. The signal generator or generators are connected to the web of such carrier. At least the median portion of the carrier preferably consists of a metallic material having a low modulus of elasticity (Duralumin (trademark) is a presently preferred material which can be used for the making of the median portion of the carrier). Furthermore, at least the median portion of the carrier should preferably exhibit high strength characteristics, and the material of such median portion is preferably a low-density metal having a high thermal conductivity.

The aforementioned sections of the base and/or carrier can constitute bar-shaped sections which are connected to the respective end portions of the carrier. The bar-shaped sections of the member flank one end portion and the sections of the base flank the other end portion of the carrier. A thin-walled jacket or covering can be provided to overlie the sections of the member, and a thin-walled jacket or covering can be provided to overlie the sections of the base.

The member and/or the base is or can be collapsible. This can be achieved by providing the member as well as the base with two leaves and by installing a hinge between the two leaves.

If the sections of the member and/or base are bar-shaped sections, the height of the bar-shaped sections preferably does not exceed the height of the carrier. This contributes to a reduction of overall height of the scale. The sections are preferably provided with enlargements for jackets which respectively form part of the member and base and overlie the sections as well as the corresponding enlargements.

The scale preferably further comprises two or more devices which prevent overstressing of the carrier.

Such devices are preferably installed in the corner portions of the base and in the overlying corner portions of the member.

The member and the base can respectively define first and second compartments for the first and second end portions of the elongated carrier. A stop can be provided in at least one of these compartments to abut the respective end portion of the properly installed or inserted carrier.

Complementary guide means can be provided in or on the at least one lateral surface of the carrier and on or in the member and base to facilitate introduction of the carrier into the compartments. The carrier is preferably provided with two spaced-apart lateral surfaces and the guide means can include elongated grooves which are provided in such lateral surfaces and ribs which are provided on the member and on the base and extend into the grooves when the carrier is properly assembled with the member and with the base.

The aforementioned web of the median portion of the carrier can be provided with two passages which communicate with the cutouts, and the signal generator or generators can be attached to the web between such passages.

The scale can further comprise first and second reinforcing portions which are respectively provided in the member and in the base. Such first and second reinforcing portions respectively have the aforementioned first and second compartments for the corresponding end portions of the carrier. The reinforcing portions can constitute integral parts of the member and base or, alternatively, they can constitute discrete components which are machined in a separate step and are thereupon installed in the member and in the base, either permanently or separably. The member can include a first chamber in the region of the first reinforcing portion and the base can be provided with a second chamber in the region of the second reinforcing portion. The two chambers preferably overlap each other in the region of the median portion of the carrier so that such median portion is accessible in assembled condition of the scale.

The aforementioned bar-shaped sections can be said to constitute skeleton frames of the member and base, respectively, and the aforementioned jackets are provided to overlie and conceal the respective skeleton frames. The jacket of the member can extend laterally beyond the base and can be provided with a preferably centrally located window above a dial having graduations which denote different weights.

The novel features which are considered as characteristic of the invention are set forth in particular in the appended claims. The improved electromagnetic weighing scale itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a plan view of a weighing scale which embodies one form of the invention, the jacket of the platform being removed for the sake of clarity and the carrier of one or more signal generators being indicated by phantom lines;

FIG. 1A is a fragmentary vertical sectional view as seen in the direction of arrows from the line IA—IA of FIG. 1;

FIG. 2 is a vertical sectional view of the scale;

FIG. 3 is an exploded vertical sectional view of the scale;

FIG. 4 is a fragmentary plan view of a second weighing scale wherein the platform is omitted for the sake of clarity and the base comprises two leaves which are articulately connected to each other by a hinge;

FIG. 8 is a fragmentary plan view of a fourth weighing scale constituting a modification of the scale which is shown in FIG. 4;

FIG. 9 is an elevational view of a carrier which can be used in the scales of FIGS. 1 to 8;

FIG. 10 is a sectional view as seen in the direction of arrows from the line X—X of FIG. 9;

FIG. 11 is a plan view of the carrier which is shown in FIGS. 9 and 10;

FIG. 15 is an enlarged side elevational view of the carrier which can be used in the scale of FIGS. 12 to 14;

FIG. 16 is a sectional view as seen in the direction of arrows from the line XVI—XVI of FIG. 15; and FIG. 17 is a sectional view as seen in the direction of arrows from the line XVII—XVII of FIG. 15.

DESCRIPTION OF PREFERRED EMBODIMENTS

Figure 5:
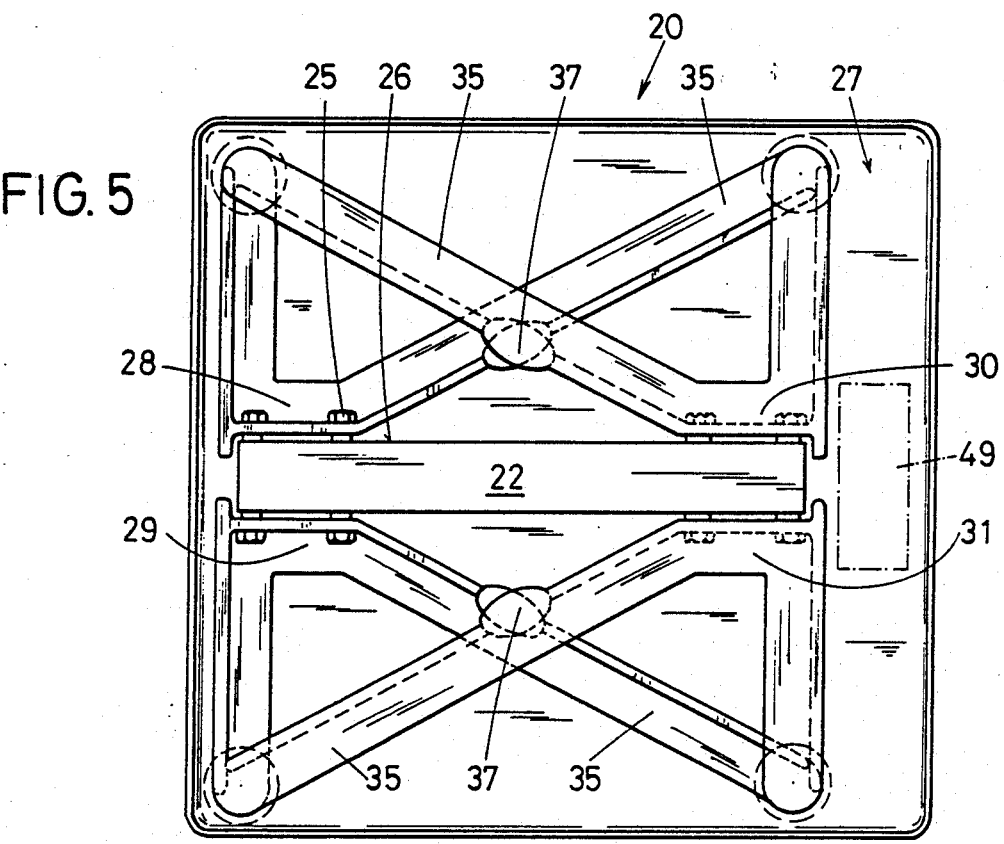
FIG. 5 is a plan view of a third weighing scale with the jacket of the platform omitted and with the carrier separably secured to the adjacent sections of the platform and base.

The drawing shows only those parts of the improved electromechanical weighing scale which are necessary for full understanding of the present invention. For example, the drawing does not show the dial, the pointer and the electric circuitry of the improved scale. All such parts of the scale which are not shown in the drawing but are necessary for its operation can be identical with those employed in conventional scales, e.g., in the "FitControl Memo" electronic digital memory bathroom scale No. 801, in the "UniControl CL" electronic digital bathroom scale No. 804, in the "FamilyData" bathroom scale No. 881, in the "SoftData" bathroom scale No. 891, in the "SportData" bathroom scale No. 896 or in the "SaniData" bathroom scale No. 890, all manufactured and distributed by the assignee of the present application.

FIGS. 1 to 3 show an electromechanical weighing scale 20 which comprises a base 27 and a load receiving and transmitting member 21 (hereinafter called platform) which overlies the base 27. As can be seen in FIG. 1, the scale 20 has a square or slightly rectangular outline with rounded corners. FIGS. 2 and 3 show that the base 27 has an upwardly extending rim 27a which is surrounded by a downwardly extending skirt 21a of the platform 21, i.e., the platform is slightly larger than the base.

The scale 20 further comprises a strain gauge having a deformable elongated beam-shaped carrier 22 which is of the type shown in greater detail in FIGS. 9 to 11. Thus, the carrier 22 has two elongated (additional) portions 22a, 22b which flank a central or median portion 33. Each of the portions 22a, 22b has a polygonal (here shown as a square or slightly rectangular) cross-sectional outline, and the median portion 33 has a substantially I-shaped cross-sectional outline with a centrally located web 41 flanked by two recesses 32 in the form of cutouts. The entire carrier 22 can be formed by drawing from a suitable metallic material and the median portion 33 can be obtained by removing some material of the carrier blank in a machine tool (e.g., in a milling machine) so as to form the recesses 32. The median section 33 preferably includes two halves which are mirror symmetrical to each other with reference to a plane (P—P in FIG. 10) which extends longitudinally of and halves the carrier 22. One side of the web 32 is contacted by a strip-shaped signal generator 34 which can constitute a resistor or a semiconductor and transmits signals whose intensity and/or other characteristics are indicative of the extent of deformation of the median portion 33 of the carrier 22, for example, when a person steps onto the upper side of the platform 21. The load which must be applied to the platform 21 in order to deform the carrier 22 is indicated by the arrow A (see FIG. 2). The web 41 can support several signal generators 34 without departing from the spirit of the invention; for example, a discrete signal generator can be bonded to each side of the web 41. Each recess 32 is bounded by two parallel plane surfaces which extend longitudinally of the carrier 22 and by two concave surfaces which extend between the respective ends of the plane surfaces.

The carrier 22 which is shown in FIGS. 9 to 11 has a top surface 22T, a bottom surface 22B, two elongated lateral surfaces 26 and two shorter lateral surfaces 24 which constitute the exposed end faces or surfaces of the two end portions 23 of the carrier. The lateral surfaces 26 have two sets of four tapped bores or holes 42 each, which are provided in the end portions 23 of the carrier 22. Each bore or hole 42 extends all the way through the respective end portion 23, i.e., from one of the lateral surfaces 26 to the other of these lateral surfaces, and each of these bores or holes receives the shanks of two threaded fasteners 25 (FIG. 1) which serve to connect the lateral surfaces 26 of the carrier 22 to the platform 21 as well as to the base 27. The arrangement is such that one end portion 23 of the carrier 22 is separably connected to the platform 21 by four pairs of threaded fasteners 25 and the other end portion 23 of the carrier 22 is separably connected to the base 27 by four pairs of threaded fasteners 25 which may but need not be identical with the fasteners 25 between the carrier and the platform. The fasteners 25 between the one end portion 23 of the carrier 22 and the platform 21 can be said to constitute a means for deforming the carrier in response to the application of load (arrow A) to the platform 21, i.e., in response to the tendency of the platform 21 to descend and to thus approach the base 27. The bores or holes 42 in each of the end portions 23 preferably do, but need not, have identical diameters.

The illustrated base 27 includes two mirror symmetrical sections 28, 29 (shown in FIG. 1 by solid lines) which flank the respective end portion 23 of the carrier 22 and are separably connected to such end portion by the respective threaded fasteners 25. Analogously, the platform 21 includes two mirror symmetrical sections 30, 31 (shown in FIG. 1 by broken lines) which flank the carrier 22 and are separably connected to the corresponding end portion 23 of the carrier 22 by the respective threaded fasteners 25.

The sections 28, 29 are integral with each other and define a first socket or compartment 38 (FIG. 1A) for the respective end portion 23 of the carrier 22, and the sections 30, 31 (which are also integral with each other) define a similar socket or compartment for the other end portion 23 of the carrier. Those walls (39) of the sections 28, 29 which are adjacent the socket 38 of FIG. IA are provided with apertures 40 for the shanks of the respective threaded fasteners 25. Similar apertured walls of the sections 30, 31 forming part of the platform 21 are provided to bound the socket for that end portion 23 of the carrier 22 which is separably connected to the platform 21. The fasteners 25 can be replaced with other suitable means for separably connecting or securing the end portions 23 of the carrier 22 to the platform 21 and base 27 without departing from the spirit of the invention.

An advantage of the scale 20 is that it comprises a small number of parts. This is attributable in part to the fact that the sections 28, 29 constitute a first integral unit and the sections 30, 31 constitute a second integral unit.

FIG. 1 further shows that the sections 28, 29 of the base 27 and the sections 30, 31 of the platform 21 constitute or include bar-shaped components 35 each of which has a substantially I-shaped cross-sectional outline. These bar-shaped parts are designed to transmit eccentrically applied loads from the platform 21 to the respective end portion 23 of the carrier 22 as well as to transmit loads from the other end portion 23 to the base 27.

The platform 21 further comprises a thin-walled connector or jacket 21b which overlies the sections 30, 31 and provides a continuous top surface for application of the load A, e.g., for the feet of a person wishing to ascertain her or his weight. In order to prevent excessive deformation of the thin-walled jacket 21b in the spaces between the bar-shaped components 35, such components are provided with enlargements 37 with preferably flat top faces to support selected portions of the underside of the jacket 21b. The base 27 can include a similar thin-walled jacket or connector 27b beneath the respective sections 28 and 29. The jacket 27b is provided with the rim 27a, and the jacket 21b is provided with the rim 21a. The jackets 21b, 27b are designed to stand tensional stresses.

The reference character 49 denotes in FIG. 1 a dial beneath a window in the jacket 21b. The pointer which cooperates with the dial moves into register with a graduation denoting the magnitude of the load A upon the platform 21a when the scale 20 is in use. The electrical connection between the signal generator or generators 34 on the web 41 of the median portion 33 of the carrier 22 and the pointer which cooperates with the dial 49 is not shown in the drawing. Such connection can be of any known design. Reference may be had to the aforementioned commonly owned allowed copending patent application Ser. No. 056,852.

The four corners of the scale 20 are or can be provided with suitable (preferably adjustable) abutments which prevent the application of excessive loads to the carrier 22 and/or to other parts of the scale. Such load limiting abutments are well known in the art and, therefore, they are not shown in the drawing.

The height of the components 35 forming parts of the sections 28, 29 and 30, 31 need not exceed the height of the carrier 22. Thus, the overall height of the scale 20 need not appreciably exceed the height of the carrier 22.

The enlargements 37 of the sections 28, 29 and 30, 31 ensure that the platform 21 and the base 27 exhibit the desired moments of resistance.

Figure 6:
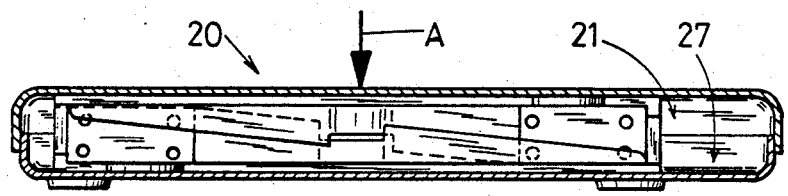
FIG. 6 is a vertical sectional view of the scale which is shown in FIG. 5.
Figure 7:
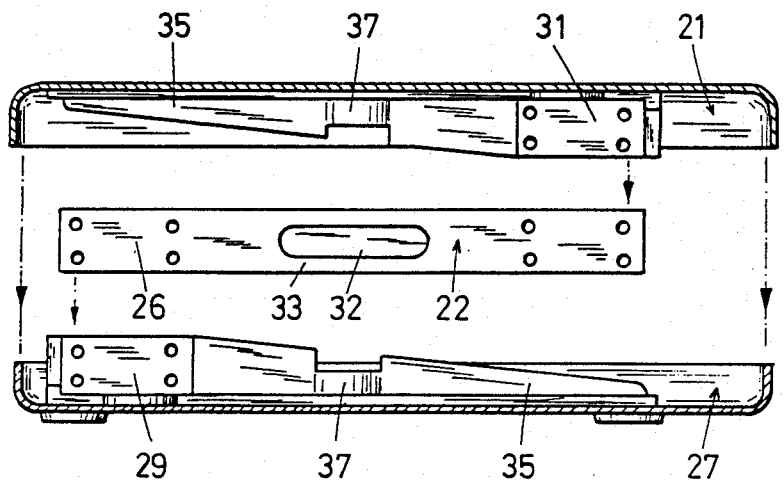
FIG. 7 is an exploded vertical sectional view of the scale of FIGS. 5 and 6.

FIGS. 5 to 7 show a modified weighing scale 20 wherein all such parts which are identical with or clearly analogous to corresponding parts of the scale of FIGS. 1 to 3 are denoted by similar reference characters. The main difference is that the sections 28, 29 of the base 27 and the sections 30, 31 of the platform 21 employ different bar-shaped components 35 and that the bar-shaped components 35 of the platform sections 28, 29 and of the base sections 28, 29 define different enlargements 37.

FIGS. 4 and 8 show portions of two additional weighing scales wherein the sections 36 of the base 27 form a pair of leaves which are articulately connected to each other by hinges 43. This renders it possible to collapse the base 27 into a relatively small package, e.g., when the scale is taken along on a trip or for the purposes of storage. The platforms (not shown) of the scales of FIGS. 4 and 8 are also assembled of pairs of leaves with a hinge between such leaves. The illustrated hinges 43 are adjacent the respective lateral surfaces 26 of the corresponding carriers 22.

Figure 12:
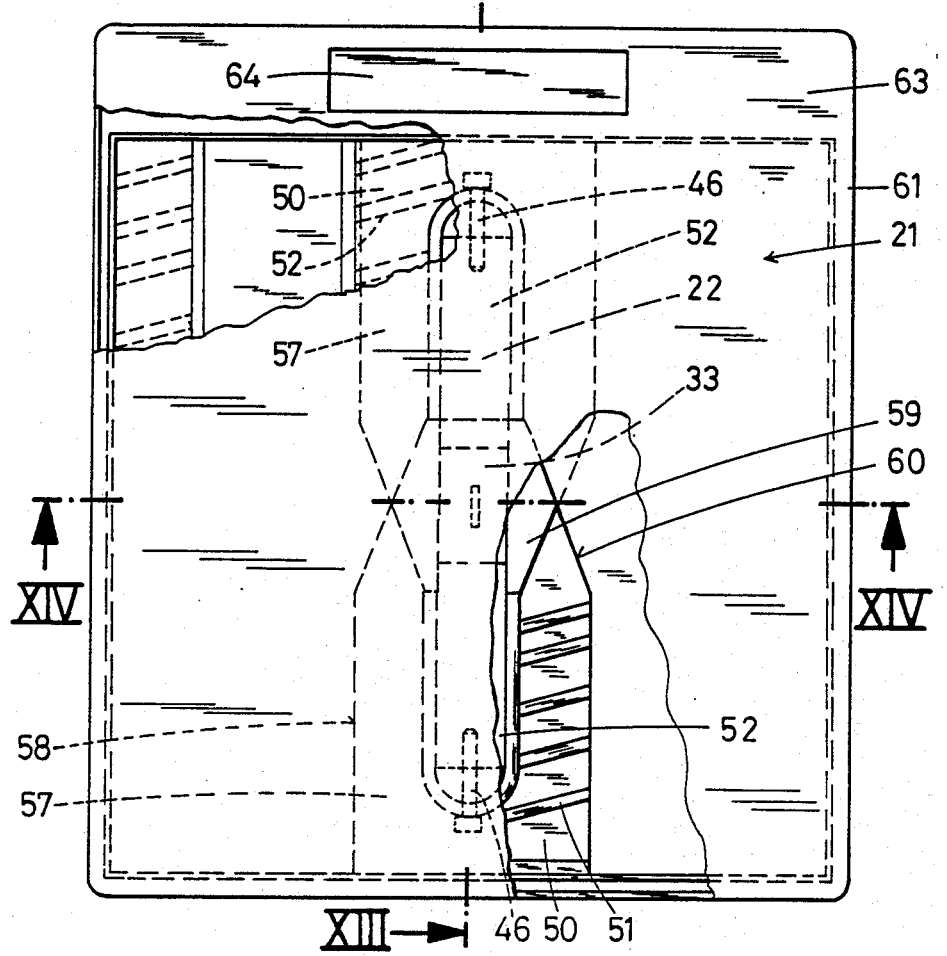
FIG. 12 is a plan view of a fifth weighing scale, with a portion of the jacket of the platform broken away.
Figure 13:
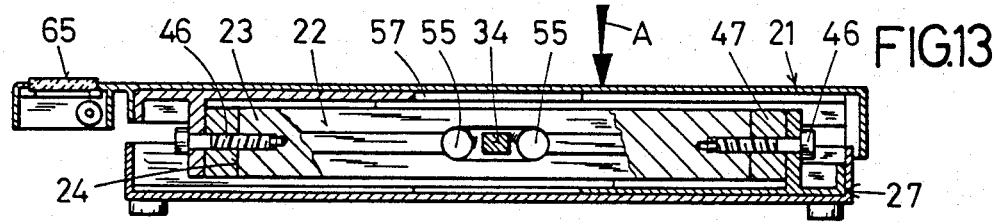
FIG. 13 is a vertical sectional view as seen in the direction of arrows from the line XIII—XIII of FIG. 12.
Figure 14:
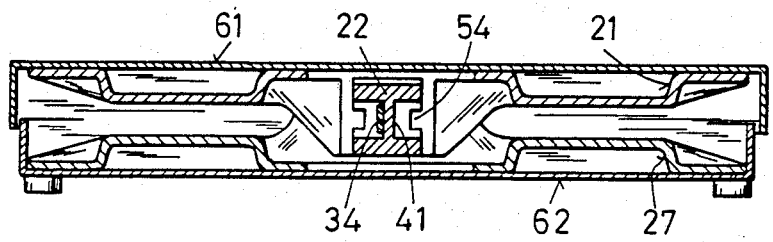
FIG. 14 is a vertical sectional view as seen in the direction of arrows from the line XIV—XIV of FIG. 12.

A presently preferred embodiment of the improved electromechanical weighing scale is shown in FIGS. 12 to 14, and the carrier 22 which can be used in this scale is preferably of the type shown in FIGS. 15 to 17. This scale again comprises a base 27 and a platform 21 which overlies the base and has an extension 63 projecting laterally beyond the corresponding side of the base 27 and provided with a window 65 above a dial 64. The base 27 includes a reinforcing or thickened portion 50, and a similar reinforcing or thickened portion is provided on the platform 21. The thickened or reinforcing portion 50 of the base 27 extends upwardly toward the platform 21, and the reinforcing portion 50 of the platform 21 extends downwardly toward the base 27. The reinforcing portion 50 of the base 27 extends toward the carrier 22 from that side of the base 27 which is remote from the extension 63, and the reinforcing portion 50 of the platform 21 extends from the extension 63 to the corresponding lateral surface of the carrier 22. As can be seen in FIG. 12, the reinforcing portion 50 of the base 27 includes a set of parallel ribs 51 which are preferably equidistant from each other and the upper sides or top lands of which terminate at an internal compartment 52. The ribs 51 of the reinforcing portion 50 of the platform 21 terminate at a second internal compartment 52. The two compartments 52 have open sides which confront the respective sides of the median portion 33 of the elongated beam-shaped carrier 22. The open sides of the compartments 52 facilitate insertion of the respective end portions 23 of the carrier 22 into the corresponding compartments 52. Insertion of an end portion 23 into the respective compartment 52 is completed when the end face 24 of such end portion engages a stop 47 in the compartment. Once the end portions 23 are properly received in their respective compartments 52, they are ready to be secured to the corresponding part (platform 21 or base 27) by one or more threaded fasteners 46. The shank of each fastener 46 extends through a hole in the respective part 21 or 27 and through a hole in the corresponding stop 47. The shanks of properly applied fasteners 46 extend into tapped blind bores 45 which are provided in the respective end faces or lateral surfaces 24 of the end portions 23.

The arrangement is preferably such that one end portion 23 of the carrier 22 is assembled first with the platform 21 or with the base 27, and the other end portion 23 is thereupon assembled with the base 27 or platform 21. Those portions of the base 27 and platform 21 which define the respective compartments 52 are preferably identical so that it is immaterial whether the carrier 22 is first assembled with the platform 21 and thereupon with the base 27 or vice versa. This contributes significantly to simplicity and convenience of assembling the scale of FIGS. 12 to 14.

In order to further facilitate assembly of the carrier 22 with the base 27 and platform 21 of FIGS. 12 to 14, the lateral surfaces 26 of the carrier 22 are provided with elongated guide means in the form of longitudinally extending grooves 48 (see FIGS. 14 to 17). The two grooves 48 communicate with each other by way of two transversely extending passages 55 in the form of round bores or holes which are provided in the median portion 33 of the carrier 22 and each of which extends all the way between the bottom surfaces 56 in the grooves 48. The passages 55 flank a relatively thin and narrow web 32 at least one side of which carries a signal generator 34 in the form of a strip constituting a resistor or a semiconductor and being glued or otherwise reliably secured to the respective side of the web 44. FIGS. 14 to 17 show a single strip 34; however, it is equally within the purview of the invention to apply several strips to one side of the web 32 or to apply one or more strips to each side of such web.

The grooves 48 in the lateral surfaces 26 of the carrier 22 receive ribs 54 which are provided on the platform 21 and on the base 27. The composite guide means 48, 54 ensure that the carrier 22 can be reliably and rapidly as well as conveniently inserted in an optimum position to fully enter the respective compartments 52 and to come into abutment with the respective stops 47.

The platform 21 is provided with a first chamber 57 bounded by surfaces 58 which are parallel to one another and merge into mutually inclined facets 60. In the region of the respective compartment 52, the facets 60 merge into a horizontally extending transverse surface at the open side of the respective compartment 52. Similar surfaces 58, facets 60 and transverse surface bound a chamber 57 of the base 27. The two chambers 57 are similar to each other but are disposed at different levels. These chambers overlap each other at 59 in the region of median portion 33 of the carrier 22. Thus, the median portion 33 is accessible upon completed assembly of the carrier 22 with the platform 21 and base 27. Such accessibility is desirable in order to facilitate the application or replacement of the strip or strips 34 and/or to carry out adjustments. Those portions of the platform 21 and base 27 which are adjacent the respective reinforcing portions 50 are disposed in common planes. Such portions of the platform and base terminate at the corresponding reinforcing portions.

The reinforcing portions 50 of the base 27 and platform 21 in the weighing scale of FIGS. 12 to 14 are separately produced parts which are thereupon affixed to the platform and to the base, respectively. If desired, the reinforcing portions 50 can constitute integral parts of the platform 21 and base 27, i.e., they can be formed at the time of making the platform and the base.

The weighing scale of FIGS. 12 to 14 is operative with the heretofore described parts plus a conventional circuit which transmits signals from the signal generator or generators 34 to the means for moving the pointer along the dial 64. However, and in order to enhance the appearance of the weighing scale, it is normally preferred to provide the platform 21 with a jacket or connector 61 and to provide the base 27 with a jacket or connector 62. These jackets can be made of thin metallic or plastic sheet material because they are not subjected to any stresses or are subject to negligible stresses when the weighing scale is in actual use. The jackets 61 and 62 can be supplied in different colors so as to facilitate identification of different scales by their owners or users. Moreover, the configuration of jackets 61, 62 can differ from scale to scale so that different scales can be identified not only by the color of their jackets but also by the shapes of such jackets. For example, the scale can have an envelope or housing which has a square, rectangular, other polygonal or oval outline.

The aforementioned extension 63 can form an integral part of the jacket 61, i.e., of the platform 21. The dial 64 can furnish a digital readout of information denoting the magnitude of the load A, e.g., the weight of a person standing on the platform 21.

The feature that the web 41 of the median portion 33 of the carrier 22 is relatively thin ensures that the web is subjected to pronounced shearing stresses in response to the application of a load A to the upper side of the jacket 21b of the platform 21.

The improved weighing scale is susceptible of many additional modifications without departing from the spirit of the invention. For example, the surfaces 24 and/or 26 at the end portions 23 of the carrier 22 can be bonded to the platform 21 and base 27 by resorting to a suitable adhesive. Adhesives which can be used to secure the carrier to the platform 21 and/or base 27 are available on the market. If an adhesive is used in lieu of the fasteners 25 or 46, the cost of the weighing scale is reduced considerably because these fasteners can be dispensed with and it is not necessary to drill tapped and/or other holes into the end portions 23 and/or into the adjacent parts of the weighing scale.

As mentioned above, it is further possible to change the configuration of the base 27 and/or platform 21. Moreover, the configuration of bar-shaped portions 35 and/or 36 can depart from the configurations which are shown in the drawing.

In the embodiments which are shown in the drawing, the means for connecting the carrier 22 to the platform 21 are identical with the means for affixing the carrier to the base 27. However, it is equally within the purview of the invention to permanently bond the carrier 22 to the base 27 and to separably connect the carrier to the platform 21 or vice versa, i.e., it is possible to employ connecting means (between the carrier and the platform) which are different from the means for affixing the carrier to the base.

An important advantage of the improved weighing scale is that the transmission of load from the platform 21 to the carrier 22 takes place by way of lateral surfaces 26 and/or 24 of the carrier. This renders it possible to reduce the overall height of the scale 20 without affecting its accuracy. Thus, the strain gauge including the carrier 22 and the signal generator or signal generators 34 need not be installed at a separate level between the levels of the base 27 and platform 21. As shown in FIGS. 1-3 and 5-7, the application of load can take place by way of the longer lateral surfaces 26 of the carrier 22. On the other hand, the embodiment of FIGS. 12-14 employs a carrier 22 wherein the application of load takes place by way of the relatively small lateral surfaces 24 which constitute the end faces of end portions 23 of the carrier. In all of the illustrated embodiments, the means for connecting the carrier 22 with the platform 21 and base 27 includes threaded fasteners 25 or 46.

Another important advantage of the improved scale is that the strip or strips 34 generate signals exclusively in response to the application of shearing stresses to the carrier 22. Consequently, the strip or strips 34 can be applied over the neutral line or chord of the carrier 22, preferably by bonding the strip or strips to the carrier. This ensures that bending (if any) of the carrier in response to the application of a load A cannot appreciably influence the accuracy of measurements. At most, eventual bending of the carrier 22 under load will induce measurement errors of the second or third order which have no appreciable bearing upon the accuracy of measurements. The reason for such independence of signals from the bending of carrier 22 is that the web 41 is located in the central symmetry plane of the carrier 22 so that, if the carrier is bent in response to the application of a load A to the platform 21, such bending of the carrier does not entail any, or any appreciable, lengthening or shortening of the strip or strips 34 on the web.

The material of the carrier 22 is preferably a metallic material having a low modulus of elasticity, a high stability, a highly satisfactory, thermal conductivity and a low density. Duralumin (trademark) is an alloy which exhibit such desirable characteristics.

A further important advantage of the improved weighing scale is that it need not employ two discrete scales, even if it is constructed and assembled in such a way that its base and/or its platform comprises two leaves or panels which are articulately connected to each other by hinges, e.g., in a manner as shown in FIGS. 4 and 8. The absence of any need for utilizing two discrete scales renders it possible to dispense with the calibration and/or other adjustments of several discrete scales and the balancing of so-called corner loads is simpler and less time-consuming than in an apparatus with two discrete electromagnetic scales. As shown in FIG. 4 and 8, the hinges 43 can be installed between the sections of the skeleton frame of the platform and/or base 27. Thus, it is not necessary to employ several strain gauges, at least one for each discrete scale (as in heretofore known collapsible scales). This is accomplished in that the scale of FIG. 4 or 8 employs hinges between the passive components or sections of the platform and/or base, namely between components which serve no other purpose than to transmit deforming stresses to or to receive stresses from the carrier 22.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An electromechanical weighing scale, comprising a base; a load receiving and transmitting member above said base; a deformable carrier having a predetermined height and disposed above said base and beneath said member, said carrier having at least one lateral surface and being at least partially confined within at least one of the parts including said member and said base so that the overall height of that portion of the scale which includes said carrier, said base and said member does not appreciably exceed said predetermined height; at least one deformation-responsive signal generator operatively connected with said carrier; and means for deforming said carrier, including means for connecting said lateral surface of said carrier to said member.

2. The scale of claim 1, wherein said carrier is elongated and has two end portions each having an end face, one said end faces including said lateral surface.

3. The scale of claim 1, wherein said connecting means includes means for separably securing said carrier to said member.

4. The scale of claim 3, wherein said securing means includes at least one threaded fastener.

5. The scale of claim 1, wherein said connecting means includes means for permanently securing said carrier to said member.

6. The scale of claim 5, wherein said securing means includes an adhesive.

7. The scale of claim 1, wherein said carrier is elongated and includes first and second end portions, and further comprising means for affixing one of said end portions to said base.

8. The scale of claim 7, wherein said one end portion has an end face and said affixing means includes means for attaching said end face to said base.

9. The scale of claim 1, wherein said carrier consists of drawn metallic material.

10. The scale of claim 1, wherein at least one of the parts including said base and said member comprises bar-shaped sections which are connected with said carrier.

11. The scale of claim 10, wherein at least one of the parts including said member and said base further includes a thin-walled jacket overlying the respective sections.

12. The scale of claim 1, wherein at least one of the parts including said member and said base is collapsible.

13. The scale of claim 1, wherein at least one of the parts including said member and said base comprises bar-shaped sections which are connected to said carrier, said carrier having a predetermined height and said sections having a height which at most equals the height of said carrier.

14. The scale of claim 13, wherein said sections have enlargements and each of said parts further comprises a thin-walled jacket overlying the respective sections and their enlargements.

15. The scale of claim 1, further comprising complementary guide means provided in said at least one lateral surface on the one hand and on said member and said base on the other hand.

16. An electromechanical weighing scale, comprising a base; a load receiving and transmitting member above said base; a deformable elongated carrier disposed between said base and said member, said carrier including first and second end portions and having at least one lateral surface, said member including two sections flanking one of said end portions; at least one deformation-responsive signal generator operatively connected with said carrier; and means for deforming said carrier, including means for connecting said lateral surface of said carrier to said member.

17. The scale of claim 16, wherein said base comprises two sections which flank the other of said end portions.

18. The scale of claim 17, wherein said base further comprises connector means for the respective sections.

19. The scale of claim 17, wherein the sections of said base are integral with each other.

20. The scale of claim 16, wherein said member further comprises connector means for said sections.

21. The scale of claim 16, wherein the sections of said carrier are integral with each other.

22. An electromechanical weighing scale, comprising a base; a load receiving and transmitting member above said base; a deformable elongated carrier disposed between said base and said member, said carrier including first and second end portions and having at least one lateral surface, said member having two first rod-shaped sections flanking one of said end portions and connected with said carrier, said base having two second rod-shaped sections flanking the other of said end portions and connected with said carrier; at least one deformation-responsive signal generator operatively connected with said carrier; and means for deforming said carrier, including means for connecting said lateral surface of said carrier to said member.

23. An electromechanical weighing scale, comprising a base; a load receiving and transmitting member above said base; at least one of the parts including said member and said base being collapsible and said collapsible part including two leaves and a hinge between said leaves; a deformable carrier disposed between said base and said member, said carrier having at least one lateral surface; at least one deformation-responsive signal generator operatively connected with said carrier; and means for deforming said carrier, including means for connecting said lateral surface of said carrier to said member.

24. An electromechanical weighing scale, comprising a base; a load receiving and transmitting member above said base, said member and said base having polygonal outlines with a plurality of corners; a deformable carrier disposed between said base and said member, said carrier having at least one lateral surface; at least one deformation-responsive signal generator operatively connected with said carrier; means for deforming said carrier, including means for connecting said lateral surface of said carrier to said member; and means for preventing overstressing of said carrier, said preventing means being provided in at least one of said corners.

25. An electromechanical weighing scale, comprising a base; a load receiving and transmitting member above said base, said member and said base respectively defining first and second compartments; a deformable elongated carrier disposed between said base and said member, said carrier having at least one lateral surface and including two end portions one of which is received in the compartment of said member and the other of which is received in the compartment of said base; at least one deformation-responsive signal generator operatively connected with said carrier; and means for deforming said carrier including means for connecting said lateral surface of said carrier to said member.

26. The scale of claim 25, further comprising a stop provided in at least one of said compartments and abutting the respective end portion.

27. An electromechanical weighing scale, comprising a base; a load receiving and transmitting member above said base; a deformable elongated carrier disposed between said base and said member, said carrier having two spaced-apart lateral surfaces; at least one deformation-responsive signal generator operatively connected with said carrier; means for deforming said carrier, including means for connecting one of said lateral surfaces to said member; and complementary guide means provided in said lateral surfaces on the one hand and on said member and said base on the other hand, including grooves in said lateral surfaces and ribs provided on said member and said base and extending into said grooves.

28. An electromechanical weighing scale, comprising a base; a load receiving and transmitting member above said base; a deformable elongated carrier disposed between said base and said member, said carrier having at least one lateral surface and including a median portion having a web and two recesses flanking said web, said web having two passages; at least one deformation-responsive signal generator provided on said web intermediate said passages; and means for deforming said carrier, including means for connecting said lateral surface of said carrier to said member.

29. An electromechanical weighing scale, comprising a base; a load receiving and transmitting member above said base; first and second reinforcing portions in said member and said base, respectively, said first and second reinforcing portions respectively having first and second compartments; a deformable carrier disposed between said base and said member, said carrier having at least one lateral surface and including a first end portion in the compartment of said first reinforcing portion and a second end portion in the compartment of said second reinforcing portion; at least one deformation-responsive signal generator operatively connected with said carrier; and means for deforming said carrier, including means for connecting said lateral surface of said carrier to said member.

30. The scale of claim 29, wherein said first and second reinforcing portions are integral parts of said member and said base, respectively.

31. The scale of claim 29, wherein said first and second reinforcing portions are discrete components which are affixed to said member and said base, respectively.

32. The scale of claim 29, wherein said member has a first chamber in the region of said first reinforcing portion and said base has a second chamber in the region of said second reinforcing portion.

33. The scale of claim 32, wherein said carrier is elongated and includes a median portion, said chambers having portions which overlap each other in the region of said median portion.

34. An electromechanical weighing scale, comprising a base; a load receiving and transmitting member above said base, said member including a skeleton frame and a thin-walled jacket overlying said frame; a deformable carrier disposed between said base and said member, said carrier having at least one lateral surface; at least one deformation-responsive signal generator operatively connected with said carrier; and means for deforming said carrier, including means for connecting said lateral surface of said carrier to said member.

35. An electromagnetic weighing scale, comprising a base, said base including a skeleton frame and a thin-walled jacket overlying said frame; a load receiving and transmitting member above said base; a deformable carrier disposed between said base and said member, said carrier having at least one lateral surface; at least one deformation-responsive signal generator operatively connected with said carrier; and means for deforming said carrier, including means for connecting said lateral surface of said carrier to said member.

36. An electromechanical weighing scale, comprising a base; a load receiving and transmitting member above said base, said member including a skeleton frame and a jacket overlying said frame, said jacket including an extension projection beyond said base and said extension having a window and a dial beneath said window; a deformable carrier disposed between said base and said member, said carrier having at least one lateral surface; at least one deformation-responsive signal generator operatively connected with said carrier; and means for deforming said carrier, including means for connecting said lateral surface of said carrier to said member.

37. The scale of claim 36, wherein said window is disposed substantially centrally of said extension.

* * * * *